United States Patent Office 3,491,508
Patented Jan. 27, 1970

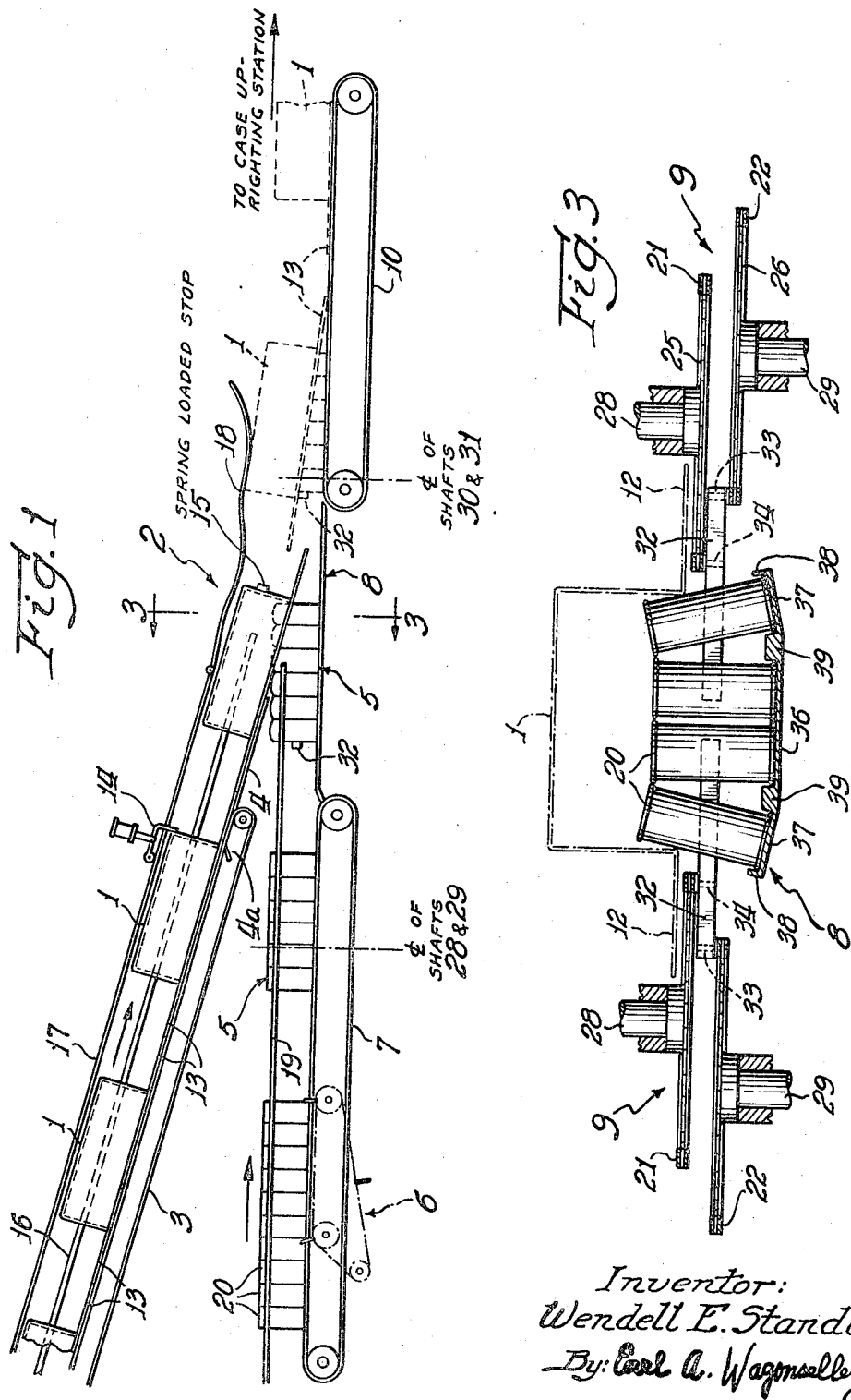

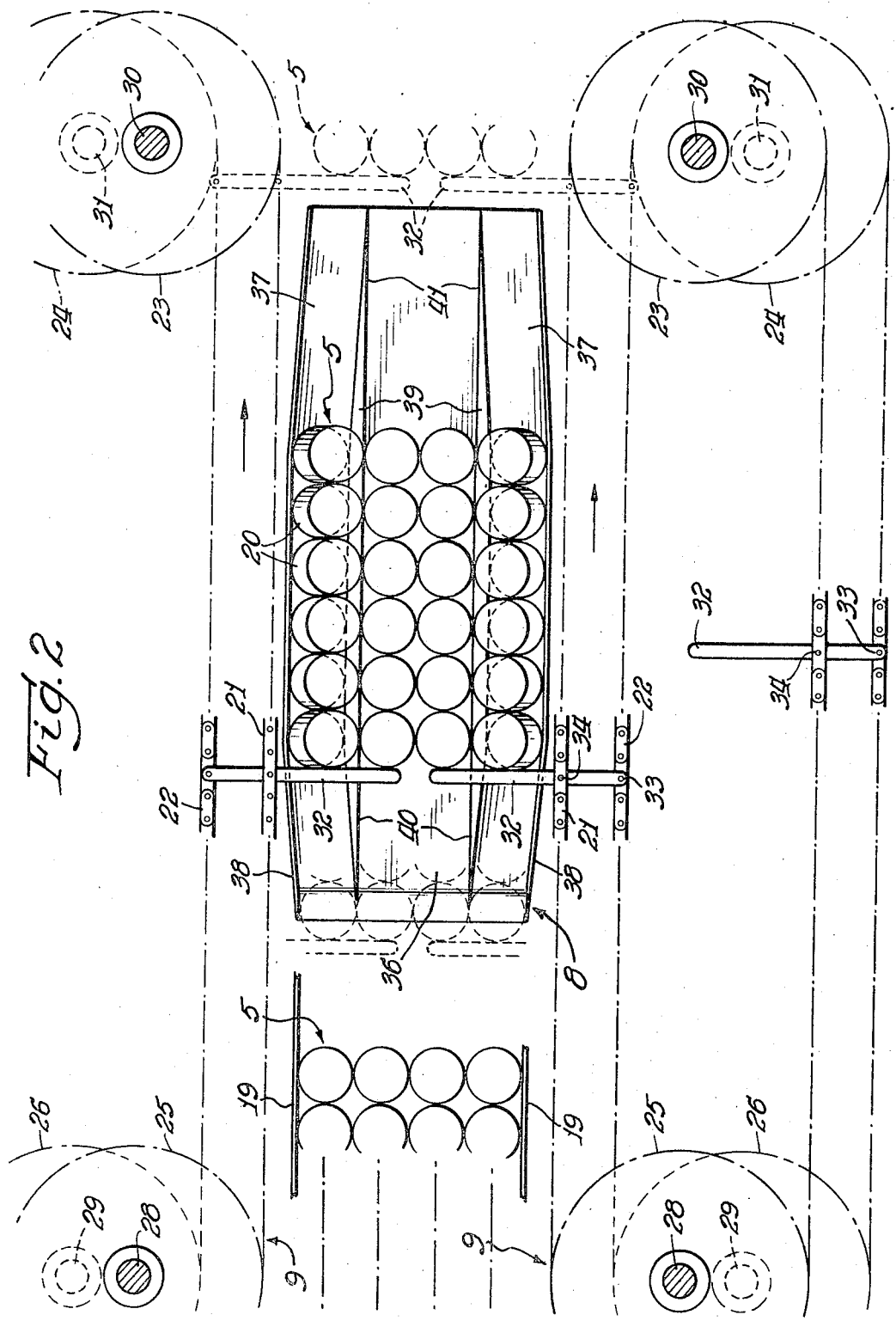

3,491,508
INVERTED CASE LOADER
Wendell E. Standley, Lake Forest, Ill., assignor to Johns-Nigrelli-Johns, Inc., Skokie, Ill., a corporation of Illinois
Filed July 25, 1966, Ser. No. 567,579
Int. Cl. B65b 5/06, 35/44, 43/52
U.S. Cl. 53—35                              5 Claims

ABSTRACT OF THE DISCLOSURE

Inverted, rectangular, open-top cases are advanced along a downwardly inclined support and brought into encompassing relation with individual rectangular groups of upstanding articles advancing on a conveyor below the case support. At the place where the case begins to encompass the articles, such articles are guided so that the outer rows of articles are tilted inward to facilitate downward movement of the case side walls along the article group. The outer articles are subsequently tilted back to upright position to complete the loading operation.

---

The present invention relates to the loading of cases such as corrugated fibreboard shipping containers with groups of articles, the cases being in inverted position while receiving their loads of contents.

An important object of the invention is to provide an inverted case loader for groups of upstanding articles such, for example, as filled cans of cylindrical, or other desired shapes, such articles being received into an inverted case which is dimensioned to fit closely about the group of articles.

Another object of the invention is to facilitate the entry of a group of upstanding articles, such as cans, into an inverted case by tilting the marginal rows of articles inwardly of the group, whereby the dimension of the upper surface of the group is slightly less than the corresponding dimension of the case which is to contain the articles, thus simplifying the problem of registration of the article group with the case.

A further object of the invention is to provide an improved form of article group advancing mechanism by means of which an article group may be effectively advanced during the time an open, inverted case is being assembled with the article group.

Other and more specific objects and advantages of the invention will become apparent as the description proceeds.

In the drawings:

FIGURE 1 is a schematic, side elevational view of the mechanism embodying the invention;

FIGURE 2 is a schematic plan view of the mechanism for advancing groups of articles to the loading station;

FIGURE 3 is a fragmentary, vertical, cross-sectional view, taken substantially along line 3—3 of FIGURE 1, looking in the direction of the arrows.

As herein disclosed, the articles are arranged in separate groups on belt conveying means. A second conveying means in the form of a push rod conveyor is employed to advance the separate groups onto a support extending to the case loading point. Inverted, open top cases are moved toward the loading point in single file down an inclined supporting plate or chute. A suitable feed device in the form of a removable case stop is employed to release cases singly to the loading point or station where the case comes to rest with its leading wall in a position in which the leading face of the advancing article group will engage the inside face of the case wall and propel the case a sufficient distance so that it will settle down and encompass the article group. Guide means are employed in connection with the article support to spread and tilt the lower portions of the outer row or rows of the grouped articles laterally away from the longitudinal center of the group while maintaining the upper ends of the articles in close relation. This causes the assembled top surface of the group to assume a lateral dimension slightly less than it has when all the articles are in upright or vertical relation, and thus facilitates the action of the case in its encompassing movement around the grouped articles. After the case has settled down around the upper portion of the article group, further advance of the articles by the push rod conveyor carries them beyond the guide means which caused tilting of the articles. The case and article group assembly is then propelled by the push rod conveyor onto another conveyor means which conducts the assembly beyond the end of the push rod conveyor to permit the case to settle into final position around the article group. From this point the filled case is advanced to further mechanism, not herein shown, which moves the filled case to normal upright position, enabling the flaps of the case to be closed by conventional closing mechanism.

Referring more particularly to the drawings, the cases 1, 1, usually formed from corrugated paperboard, are delivered to the loading station 2 by a conveyor 3 formed of two or more narrow belts which feed the cases onto an inclined plate 4. Groups of articles, indicated as a whole at 5, are formed by a grouping unit 6 and advanced toward the loading point on a conveyor 7 which may be formed from a plurality of narrow belts or endless chains feeding onto an elongated support and guide member, indicated as a whole at 8.

Article group propelling units, each indicated as a whole at 9, are located at the sides of the support member 8 to propel the articles along such support member and onto a supporting conveyor 10 upon which the inverted case may come into final encompassing position over the article group. From conveyor 10 the loaded, inverted cases may be conducted to the case uprighting station.

As herein shown, the case 1, 1 may be of the type which have hinged side-wall and end-wall flaps indicated at 12, 12 and 13, 13. Both sets of flaps will be folded outwardly and the cases are placed in inverted position upon conveyor 3 which is kept in continuous motion during operation of the machine. A releasable stop mechanism 14 is preferably employed, located near the end of conveyor 3 to release individual cases in timed relation to individual article groups as the groups advance on conveyor 7.

The plate 4 at its upper or receiving end may be formed with slots to accommodate the narrow belts that form conveyor 3 and the ends of the strips between the belts which are formed by the slots are bent downward as shown at 4a. A case released from conveyor 3 will advance over the plate 4 until it comes to rest against a releasable, spring-loaded stop means 15. This preferably comprises a pair of pivoted stop fingers yieldably held in position at opposite sides of the case path. These stop devices may be identical with those shown in the patent to Nigrelli et al., No. 3,141,274.

Side guide rails 16 are suitably supported at the sides of the case path and a top guide rail or plate 17 is supported above the conveyor 3 to guide the upwardly disposed bottom panels of the cases. At the lower end of the top guide 17 there is provided a displaceable case hold-down member 18 which may be suitably counterweighted. This member bears against the upwardly directed bottom panels of the cases and assists in moving the cases down over the article groups.

The articles to be loaded, herein shown as a cylindrical cans 20, 20, may be advanced in continuous abutted rows on conveyor 7 and guided between guide rails 19, 19. The belts of conveyor 7 are driven continuously while the machine is in operation. As the articles arrive at the grouping mechanism 6 they are stopped for a brief interval and as the mechanism 6 is operated, the articles are released in spaced groups timed with the release of cases by stop 14. The particular timing arrangement may be conventional and forms no part of the present invention. The grouping mechanism may be constructed in accordance with the grouping mechanism disclosed in the patent to Nigrelli et al., No. 3,194,382.

The cans 20, or other upstanding articles, may be arranged in any desired and convenient number of rows, four rows being herein shown as a typical and customary number.

Means are provided for positively propelling the article groups along the support and guide member 8. This preferably comprises the pair of units 9, 9, referred to above, one unit being arranged on each side of the path of travel of the article groups. Each unit, as herein shown, comprises a pair of vertically spaced sprocket chains 21 and 22 traveling over head and tail sprockets 23, 24 and 25, 26, respectively, mounted on vertical shafts.

Referring to FIGURES 2 and 3, which for simplicity show only one of the propelling units 9, the tail sprocket 25 is secured to the lower end of a vertical shaft 28 and the other tail sprocket 26 is secured to the upper end of another vertical shaft 29. The head sprocket 23 is similarly secured to the lower end of a vertical shaft 30 and the other head sprocket 24 is secured to the upper end of another vertical shaft 31. These shafts are suitably journalled in bearings on frame members and are driven by mechanism (not shown) which advances the sprocket chains at a speed which may be approximately the speed of conveyor 7.

Each pair of sprocket chains 21 and 22 has secured thereto a plurality of push bars 32, 32, two of such bars being shown in the machine as disclosed. The outer ends of the push bars 32 project into the path of the article groups and each push bar preferably propels one-half of the group. It is to be understood that, by suitable modification of the sprockets and sprocket chains and lengthening of the push bars, a single unit could propel the article group.

The push bars 32 are connected to the sprocket chains so that while propelling the article groups they will be held at right angles to the direction of travel, thus constantly keeping the article group in rectangular formation. For this purpose an end of the bar 32 is pivotally secured at 33 to a link of the chain 22 and an intermediate portion of the bar is pivotally secured at 34 to a directly opposite link of the chain 21.

As indicated in FIGURE 2, the push bars 32, in passing around the head sprockets will continue their parallel movement and thus will be withdrawn in a direction at right angles to the path of travel of the article groups. In the reverse manner, when passing around the tail sprockets the bars 32 will be projected endwise into the article path.

The positioning of the bars 32 upon the chains and the timing of the speed of the chains is such that as the article groups are released by the grouper 6 to advance on conveyor 7, the push bars will enter into the space at the rear of a group to be in propelling position as the group reaches the end of the conveyor 7 to begin its travel over the support and guide member 8. The mechanism for timing the movement of the push bars with the group forming and spacing unit may be the same as that disclosed in Patent 3,194,382.

As the articles are propelled by the push bars 32 over the support and guide member 8 the lower ends of at least the outer rows of articles are guided outwardly while the upper ends are kept in close relation or in contact so that the width of the article group becomes somewhat less than its normal width when all the articles are in regular upright formation. This permits the inverted case to start to encompass the article group without requiring an extremely accurate registry of the case over the article group. It also makes it feasible to design cases to fit the article group more snugly.

As shown in FIGURES 2 and 3, the support 8 may be formed from a metal plate 36 having its outer longitudinal edge portions 37, 37 inclined upward. Flanges 38, 38 are formed along the outer edges and raised guide strips 39, 39 are formed or secured on the plate 36 to guide the inwardly facing lower edges of articles in the outer rows. The upstream end portion of each guide strip 39 is preferably tapered as indicated at 40 and the downstream end of each strip is tapered as indicated at 41. At the upstream end of the plate 36 the sides of the plate angle outwardly and the flange 38 follows such angle. At the downstream end of the plate the flange 38 is angled back toward the raised strip 39, generally paralleling the tapered end 41 of such strip.

Thus, as the can group is advanced to a position in which the upper leading end of the group has entered in between the case side walls and is ready to contact the end wall of the case to propel the case, the outer rows of the articles making up the group will be inclined inwardly to facilitate the assembly of the case over the group. As the article group is propelled by the push bars off the support and guide member 8 and onto the conveyor 10 the articles are shifted back into normal group-forming relation to allow the case to slip readily to final position over the articles. The movement of the case to final position is assisted by the hinged member 18.

Conveyor 10 is preferably driven at a faster lineal speed than the speed of the push bars 32 for the purpose of accelerating the movement of the loaded cases away from the loading station.

It is to be understood that other forms of propelling means for the article group along the guide member may be employed. For example, this could be effected by a reciprocating member.

From the foregoing it is apparent that the present invention provides a method as well as a mechanism for loading inverted, open-top cases, with or without cover flaps, with groups of upstanding articles arranged in rectangular formation in laterally related rows. The article group is advanced in formation along a fixed path on a support and an inverted case is advanced to a loading point and supported at a small angular inclination, so that the group may move without obstruction beneath the trailing case wall and so that the leading wall of the case will be engaged on its inside surface by the leading upper face of the article group. As the article group advances to the loading point the lower ends of the articles in the outer rows are guided laterally outward while the upper ends of the articles are maintained in close relation. Engagement of the article group with the case leading wall causes the case to advance and the case is allowed to slip down over the top of the article group. As the articles and case are further advanced the lower ends of the outer rows of articles are guided back to bring the articles to normal, upright position. The case is then free to slip down to final position over the article group. This operation may be facilitated by applying downward pressure on the case as by means of the hinged member 18 or in any other desired manner. The loaded case is then carried away, preferably to a case-righting station, after which the closure flaps of the case may be sealed.

While the present invention sets forth a preferred embodiment of the invention, various changes may be made in the mechanism as disclosed without departing from the spirit of the invention, and it is therefore desired that the present embodiment be considered in all respects as illustrative and not restrictive, reference being had to the appended claims rather than to the foregoing description to indicate the scope of the invention.

I claim:
1. The method of loading open top cases in inverted position, comprising the steps of
pushing the trailing articles of a group of upstanding articles arranged in laterally related rows, to advance the group in a fixed path to a loading station, the pushing force being applied to the trailing articles at a location above the lower ends of the articles, leaving a substantial portion of the upper trailing surfaces of the articles free,
during such advance, guiding outwardly the lower ends of the articles in the lateral exterior rows and concurrently tilting the upper ends of such articles inwardly,
temporarily supporting at the loading station an inverted, open-top, rectangular case for free advancing movement and in a position inclined at a small angle to the article path and with only its leading wall intersecting such article path,
continuing the advance of the article group while said tilted articles are maintained in such tilted positions, thereby causing the article group to engage and propel the inverted case and causing the trailing portion of the case to slip down, whereby the case will encompass the upper part of the article group,
and, finally returning the tilted articles to normal, upright group relation and discontinuing the pushing force on the trailing articles to permit the inverted case to slip further down and complete its group encompassing movement,
in which method opposed push rods are employed, each extending inwardly of the article path from opposite directions to engage a portion of the vertical trailing surface of the article group, moving said push rods to propel the article group past the loading station and until the tilted articles are guided to normal upright position, and withdrawing the push rods from contact with the vertical trailing surface of the group to clear such surface and permit further settlement of the trailing portion of the case about the article group.

2. A mechanism for loading four-wall, rectangular, open-top cases in inverted position comprising, in combination, an elongated article support, conveyor means for advancing along said support in a fixed path a rectangular group of upstanding articles to and beyond a loading station, a case support arranged above the article path to conduct inverted cases to the loading station, means for releasably supporting an inverted case at an inclination to the article path with the leading wall of the case intersecting such path, whereby the upper, leading surface of the article group as it advances will engage inside the leading wall of the case and propel the case, the article support including guide means for the outer, laterally related rows of articles, said guide means having a first section adapted to guide the lower ends of the articles in said rows outwardly at the sides of the group and tilt the articles in an inward direction while maintaining the upper ends of the articles of the group in close side-by-side relation to facilitate the initial movement of the case into encompassing relation with the article group, and a second section of the guide means located beyond the first section to shift the lower portions of the articles inwardly to normal group-forming position as the article group advances, whereby the case is free to move down toward its final encompassing position, said article conveyor means comprising a traveling member supported for operation in a plane generally parallel with the article path and disposed at the side of such path, said traveling member having operatively attached thereto a push rod having a portion extending into the article path to engage and propel the articles, means for maintaining the push rod substantially at a right angle to the article path as the article group is propelled, and means for withdrawing the push rod laterally from the article path to discontinue the propulsion of the articles thereby.

3. A mechanism for loading four-wall, rectangular, open-top cases in inverted position comprising, in combination, an elongated article support, conveyor means for advancing along said support in a fixed path a rectangular group of upstanding articles to and beyond a loading station, a case support arranged above the article path to conduct inverted cases to the loading station, means for releasably supporting an inverted case at an inclination to the article path with the leading wall of the case intersecting such path, whereby the upper, leading surface of the article group as it advances will engage inside the leading wall of the case and propel the case, the article support including guide means for the outer, laterally related rows of articles, said guide means having a first section adapted to guide the lower ends of the articles in said rows outwardly at the sides of the group and tilt the articles in an inward direction while maintaining the upper ends of the articles of the group in close side-by-side relation to facilitate the initial movement of the case into encompassing relation with the article group, and a second section of the guide means located beyond the first section to shift the lower portions of the articles inwardly to normal group-forming position as the article group advances, whereby the case is free to move down toward its final encompassing position, said article conveyor means comprising in part a first elongated, endless member arranged to travel generally parallel with the article path and at one side of said path, said endless member having pivotally connected thereto a push rod with a free end portion extending transversely into the article path to engage and propel the articles, a second endless member of a construction comparable with the first endless member, disposed in a vertically separated plane from the first endless member and offset outwardly away from the first endless member and from the article path, means for pivotally connecting the second endless member to the push rod at a point spaced from its pivotal connection with the first endless member to maintain the free end portion of the push rod at a right angle to the article path.

4. The invention as defined in claim 2, in which an additional conveying and supporting means is located downstream from the second section of the article guide means, said traveling member, with its attached push rod, being arranged to propel the article group onto such additional conveying and supporting means upon which the case and article group assembly travels while the case is settling to final position about the article group.

5. The method of loading open-top cases in inverted position, comprising the steps of
advancing in a fixed path to a loading station a group of upstanding articles arranged in laterally related rows,
during such advance, guiding outwardly the lower ends of the articles in the lateral exterior rows and concurrently tilting the upper ends of such articles inwardly,
temporarily supporting at the loading station an inverted, open-top, rectangular case for free advancing movement and in a position inclined at a small angle to the article path and with only its leading wall intercepting such article path,
continuing the advance of the article group while said tilted articles are maintained in such tilted positions, thereby causing the article group to engage and propel the inverted case and causing the trailing portion of the case to slip down, whereby the case will encompass the upper part of the article group,
and, finally returning the tilted articles to normal, up right group relation to cause the inverted case to slip further down and complete its group encompassing movement, in which method the article group is propelled by push rod means engaging the trailing articles of the group above the lower ends of the articles and leaving a substantial portion of the trailing vertical surfaces of the articles free, whereby to permit the trailing end portion of the inverted case to settle about the group, said push rod means comprising opposed push rods, each extending inwardly of the article path from opposite directions to engage a portion of the vertical trailing surface of the article group, moving said push rods to propel the article group past the loading station and until the tilted articles are guided to normal upright position, and withdrawing the push rods from contact with the vertical trailing surface of the group to clear such surface and permit further settlement of the trailing portion of the case about the article group.

References Cited

UNITED STATES PATENTS

| | | | |
|---|---|---|---|
| 1,623,393 | 4/1927 | Dicely | 53—242 X |
| 2,917,882 | 12/1959 | Buck | 53—243 X |
| 3,141,274 | 7/1964 | Nigrelli et al. | 53—48 |
| 3,377,774 | 4/1968 | Nigrelli et al. | 53—159 X |
| 3,300,947 | 1/1967 | Fahrenbach | 53—186 |

THERON E. CONDON, Primary Examiner

N. ABRAMS, Assistant Examiner

U.S. Cl. X.R.

53—242; 198—164